R. E. WINTERS.
SPEED CHANGE MECHANISM.
APPLICATION FILED MAR. 17, 1920.
1,407,716.
Patented Feb. 28, 1922.
2 SHEETS—SHEET 1.
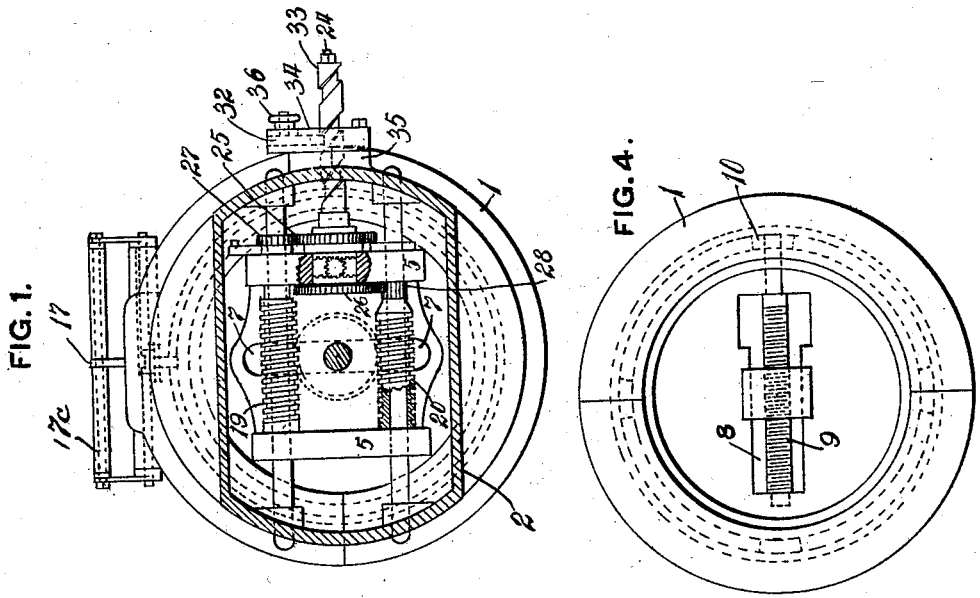
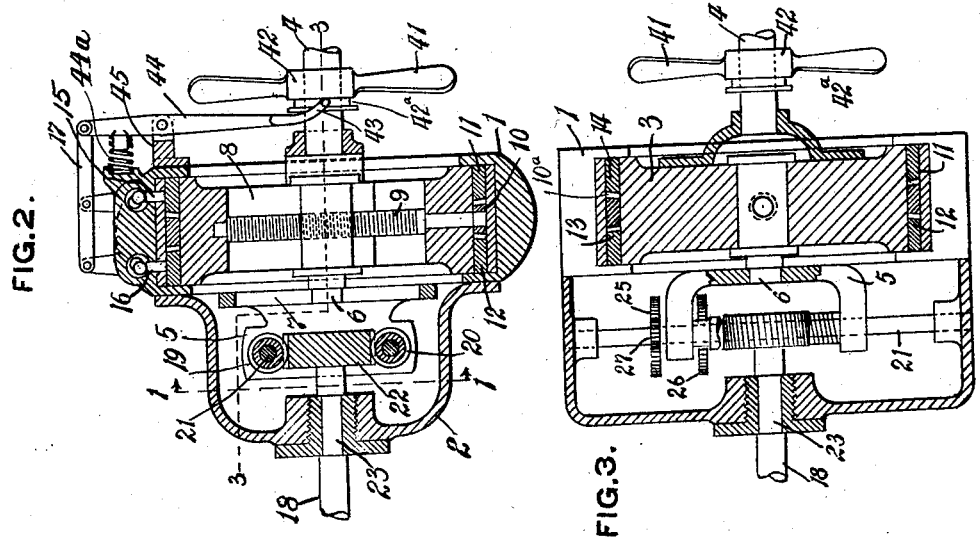
INVENTOR
Robert E. Winters
by William B. Wharton
his attorney R. E. WINTERS.
SPEED CHANGE MECHANISM.
APPLICATION FILED MAR. 17, 1920.
1,407,716.
Patented Feb. 28, 1922.
2 SHEETS—SHEET 2.
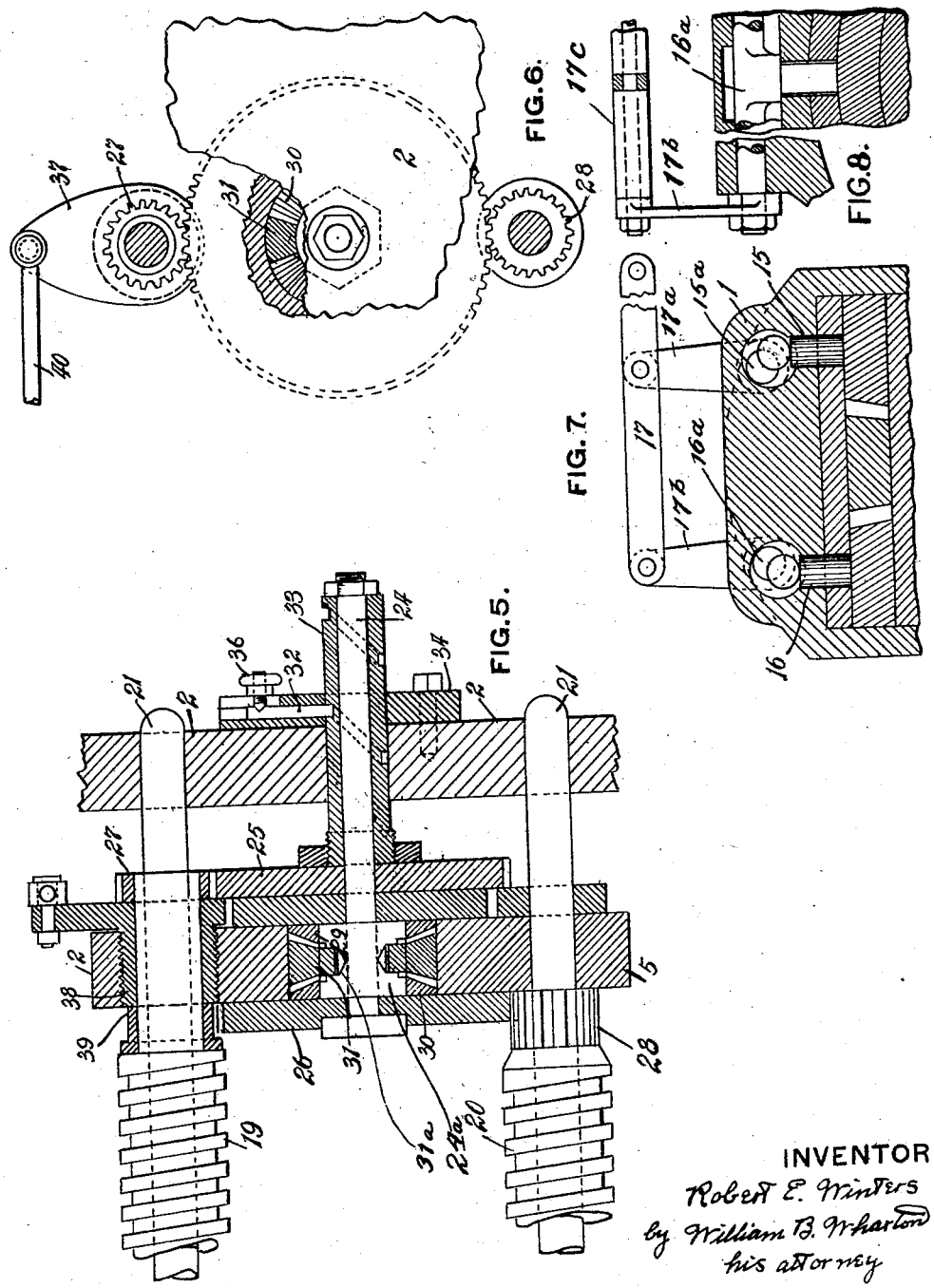
INVENTOR
Robert E. Winters
by William B. Wharton
his attorney

UNITED STATES PATENT OFFICE.

ROBERT E. WINTERS, OF CORAOPOLIS, PENNSYLVANIA, ASSIGNOR OF ONE-HALF TO ANTHONY E. DEAN, OF PITTSBURGH, PENNSYLVANIA.

SPEED-CHANGE MECHANISM.

1,407,716.  Specification of Letters Patent.  Patented Feb. 28, 1922.

Application filed March 17, 1920. Serial No. 366,490.

*To all whom it may concern:*

Be it known that I, ROBERT E. WINTERS, a citizen of the United States, and resident of Coraopolis, in the county of Allegheny and State of Pennsylvania, have invented a new and useful Improvement in Speed-Change Mechanism, of which the following is a specification.

This invention relates to a speed change mechanism and constitutes an improvement over the device of Patent No. 1,352,716, dated September 14, 1920.

The object of the invention is to provide mechanism for use in motor driven vehicles, or stationary machinery, by means of which gear shifting arrangements are rendered unnecessary.

A further object of the invention is to provide means which operate smoothly in changing speeds, which are so compactly arranged as to occupy a relatively small space, and which are strong and simple in construction.

In the accompanying drawings Fig. 1 is a rear elevation of the device with a portion of the housing removed; Fig. 2 is a central vertical section through the device; Fig. 3 is a section on the line 3—3, Fig. 2; Fig. 4 is a front elevation of the device; Fig. 5 is an enlarged detail of a portion of the controlling means of the device; Fig. 6 is a view thereof partly in elevation and partly in section; Fig. 7 is a detail view of the brake mechanism by means of which the change of speed is controlled; and Fig. 8 is a fragmentary sectional detail of a portion of the brake operating means.

The device comprises a main housing 1 and an auxiliary housing 2, within both of which the main operating parts of the mechanism are contained.

Within the housing 1 is the power transmitting wheel 3 secured to the power operated shaft 4 of a motor. This portion of the device corresponds in general to that of the prior application noted above; and has for the transmission of power to a pitman 5, the pin 6, which is adjustable along the diameter of the wheel 3 in a slot 8 therein, and which engages in a slot 7 in the pitman.

For adjusting the position of the pin, a worm shaft 9 passes through the thickest portion of the pin 6 and is threaded to it interiorally. The shaft 9 is rotatably mounted in the wheel 3 so that its rotation causes a rectilinear movement of the pin. On one extremity of the shaft 9 is a pinion 10 meshing with a pair of circular racks 11 and 12 on rings 13 and 14 engaged frictionally on the wheel 3. A plurality of toothed spacers $10^a$ are inserted around the periphery of wheel 3 between rings 13 and 14. Bearing against rings 13 and 14 respectively are pressure arms 15 and 16, which are acted upon by cam rods $15^a$ and $16^a$. The cam rods $15^a$ and $16^a$ are operated by means of rock levers $17^a$ and $17^b$ mounted on a shaft $17^c$ operated by lever 17. The pressure arms 15 and 16 bear on the peripheries of rings 13 and 14 to serve as friction brakes for stopping or retarding rotation of either ring with the wheel 3. In such case the stationary or retarded ring, slipping on the periphery of the wheel, acts as a rack on the pinion 10 as the latter moves with the wheel, rotating the worm shaft 9.

The rotation of worm shaft 9 moves the pin 6 either away from or toward the center of slots 7 and 8. It will be understood that if the pin is in the center of the slots the device is in neutral position and no motion will be imparted to the pitman 5. Also, the greater the distance from the center to which the pin is moved, the greater will be the length of stroke of the pitman and the greater the speed it can impart.

Novel features of the present invention reside in the means for converting the reciprocatory movement of pitman 5 into movement of rotation of a power shaft 18.

For this purpose a pair of worm racks 19 and 20 are secured to the pitman 5, and are slidable together with the pitman on stationary shafts 21 mounted in the housing 2. These worm racks 19 and 20 mesh with a worm gear 22 which is on the power shaft 18, the power shaft being journaled at 23 in the housing 2. As the shaft 18 is to be rotated continuously in one direction, it is evident that the worm racks 19 and 20 must act alternately upon the worm gear 22 in order to secure such continuous rotation. This effect is secured partially by the variations in pressure exerted on the racks by the worms at the limit of the strokes of the pitman, and partially by certain governing means arranged to cause rotation of one rack while holding the other against rotation.

Such governing means comprise a shaft 24 secured to the pitman to move therewith and passing through the wall of housing 2. On shaft 24 are a pair of spur gears 25 and 26. The gear 25 meshes with a pinion 27 on rack 19, while gear 26 meshes with a pinion 28 on rack 20. Secured to gears 25 and 26 respectively, are a pair of bevel ring gears 29 and 30, which are oppositely faced and which both mesh with bevel pinions 31. The bevel ring gears 29 and 30 are free upon an enlargement 24$^a$ of the shaft 24. In this enlarged portion 24$^a$ are cups 31$^a$ in which the bevel pinions 31 lie. The pinions are maintained in position in the cups by their meshing engagement with the ring gears 29 and 30, and by the surrounding portion of the frame 2.

In operation of the device, we may assume that the pitman 5 has just reached the extreme limit of its stroke from right to left in Fig. 1; the upper rack 19 during this stroke acting upon worm gear 22 to cause its rotation. As the pitman begins its return stroke there will be an instant of time, negligible from a disadvantageous point of view, during which the movement of lower rack 20 from left to right will tend to oppose the rotation of worm gear 22. This will cause the teeth of rack 20 to exert against those of worm gear 22 a pressure greatly in excess of that exerted by rack 19.

A pin or lug 32 engages in a spiral groove in a sleeve 33 rigidly secured to the shaft 24. This pin is held in a bracket 34, which is secured to housing 2 and maintains the lug 32 in position to engage in the spiral groove in the sleeve 33 on shaft 24. This lug 32 is adjustable in the bracket 34 by means of set screw 36 so that it may be set in proper position before use of the device.

As the pitman 5 reciprocates, moving from left to right, this engagement causes rotation of shaft 24, carrying the spur gears 25 and 26. Since the pressure of the teeth of rack 20 upon those of worm gear 22 is great, there is a tendency for the rack 20, together with spur gears 26 and 28, to be held against rotation. This tendency is increased by the action of the bevel ring gears 29 and 30 and the bevel pinions 31. In the instance given, as there is a tendency for the spur gear 26 to be held against rotation ring gear 30 is also held, but the ring gear 29 is free to rotate on the enlarged shaft portion 24$^a$. The bevel pinions 31 also rotate as they travel with shaft 24 on the stationary ring gear 30, and by their action increase the speed of rotation of ring gear 29 and consequently that of spur gear 25 to which it is secured.

It will be seen that when once this action has been started, it will continue so long as the pitman moves in the same direction; the spur gears 25 being rotated at a high rate of speed while the spur gears 26 and 28, together with the rack 20, are held against rotation.

As the rack 20 is held against rotation, it acts during this stroke of the pitman upon worm gear 22 to impart to it rotation in the same direction as that imparted by the rack 19 during movement in the opposite linear direction. During this movement also, the relatively rapid rotation of spur gear 25, meshing with pinion 27 on the rack 19, causes the rack to be rotated with such speed that it leads the rotation of worm gear 22, and its teeth exert no pressure on those of the worm gear tending to oppose its rotation in the proper direction.

During the return movement of the pitman from right to left, the effect is exactly opposite. In this case the rack 19 is held by the pressure of its teeth upon those of worm gear 22, and the rack 20 is rotated by the spur gear 26 and pinion 28 on the rack to cause rotation of the rack 20 at such speed as to lead the rotation of worm gear 22.

It is to be understood that the momentum of pitman movement changes the action of the worm racks on the worm gear within such an immeasurably short instant of time that the action proceeds without any such slackening in the speed at which the power shaft is rotated, as cannot be corrected by the inertia of a flywheel or of a vehicle in which the device is employed.

The reversing means for the device comprise a reversing lever 37, which has a hub portion 38 screw threaded in the housing 2 and arranged to cooperate with shoulder 39 on rack 19. The reversing lever 37 may be operated by any convenient means such as the operating lever 40.

When lever 37 is thrown, it moves inwardly by means of its screw threaded engagement with housing 2 and coming into contact with shoulder 39 on the worm serves to so modify the pressure exerted by its teeth on those of worm gear 22 as to cause a reversal of the action of the racks 19 and 20, due to the change in their action intermediate the limit of the pitman stroke. This obviously causes a reversal in the direction of rotation of worm gear 22 and power shaft 18.

Automatic speed regulating means as illustrated in the drawings, may, if desired, be provided. Such means comprise a vane 41 on a collar 42, which is both rotatably and slidably mounted on the engine shaft 4. In a peripheral seat 42$^a$ in collar 42 fits a hook member 43 on a lever arm 44. The lever arm 44 is fulcrumed in a bracket 45 on the housing 1 and is secured at its extremity to rock lever 17. A compression spring 44ª bears against the lever arm 44 and tends to normally maintain collar 42 in inward position.

The vane 41 thus acts as a governing device; since when the engine shaft exceeds a certain speed, it will tend to creep outwardly on the shaft against the resistance of spring 44ª and will act through rock lever 17 and pressure arms 15 and 16 upon the brake bands. The arrangement is such that in this event the brake band 14 will be the one acted upon and by means of rack 12 and pinion 10, will rotate the worm shaft 9 and tend to cause movement of pin 6 away from the center of slots 7 and 8. This action will obviously lengthen the stroke of pitman 5 and increase the speed at which the power shaft 18 is driven in correspondence with the increase in engine speed.

A lessening in engine speed will act conversely, the vane creeping inwardly under the force exerted by spring 44ª and causing pressure arm 15 to bear upon brake band 13 to rotate the worm shaft 9 in the opposite direction and move pin 6 toward the centers of slots 7 and 8. This action will obviously shorten the stroke of pitman 5, and thus decrease the speed at which power shaft 18 is driven. If the device is applied to an automobile, and the engine speed slackens because of an upgrade, the pin 6 will be moved toward the center of slots 7 and 8, increasing the power as well as decreasing the speed of rotation of power shaft 18.

It is to be understood that this arrangement is optional only, and that under certain circumstances, it may be preferable to maintain the speed regulating means under the direct control of the operator. In such case the controlling lever may have a connection with a spring held pedal of ordinary design, or may be extended into a hand operable lever. Either of these arrangements may be made without dispensing with the automatic governing vane.

The device as a whole is strong and compact; and obviates entirely the necessity for gear shifting arrangements. Not only does it provide a definite neutral position, but also provides a smooth progression in driving speed from minimum to maximum.

What I claim is:

1. In speed change mechanism a pitman, means for reciprocating said pitman racks on said pitman, a power shaft, a gear on said power shaft meshing with said racks, a governing shaft arranged to be rotated by reciprocation of said pitman, gears on said racks, gears on said governing shaft meshing with each of said rack gears, and means on said shaft arranged to rotate said gears alternately during alternate strokes of the pitman.

2. In speed change mechanism a pitman, means for reciprocating said pitman, racks on said pitman, a power shaft, a gear on said power shaft meshing with said racks, gears on said racks, and gears actuated by movement of said pitman for rotating said racks alternately during alternate pitman strokes.

3. In speed change mechanism a pitman, means for reciprocating said pitman, racks on said pitman, a power shaft, a gear on said power shaft meshing with said racks, gears on said racks, governing gears actuated by movement of said pitman and meshing with each of said rack gears, and means arranged to alternately hold each of said governing gears stationary while causing rotation of the other thereof at an increased rate of speed.

4. In speed change mechanism the combination of a pitman, a driven shaft, a driving wheel connected therewith, means adjustable in said driving wheel for varying the length of stroke of said pitman, racks on said pitman, a power shaft, a gear on said power shaft meshing with said racks, gears on said racks, and gears actuated by movement of said pitman for rotating said racks alternately during alternate pitman strokes.

5. In speed change mechanism the combination of a pitman, a driven shaft, a driving wheel connected therewith, a pin adjustable in said driving wheel for varying the length of stroke of said pitman, racks on said pitman, a power shaft, a gear on said power shaft meshing with said racks, gears on said racks, gears actuated by movement of said pitman for rotating said racks alternately during alternate pitman strokes; a governing vane on said driven shaft, and connection between said governing vane and said adjustable pin for automatically adjusting the position of the pin in the driving wheel.

6. In speed change mechanism a pitman, means for reciprocating said pitman, racks on said pitman, a power shaft, a gear on said power shaft meshing with said racks, means arranged to alternately rotate one of said racks while holding the other thereof during alternate strokes of the pitman, and operable means on said pitman arranged to contact one of said racks for reversing the operation of both thereof.

7. In speed change mechanism a pitman, means for reciprocating said pitman, a power shaft, a gear on said power shaft meshing with said racks, a governing shaft arranged to be rotated by reciprocation of said pitman, gears on said racks, gears on said governing shaft meshing with each of said rack gears, means on said shaft arranged to rotate said gears alternately during alternate strokes of the pitman, a lever member having an extending portion arranged to contact one of said racks for reversing the operation of both thereof, and means for operating said lever member.

8. In speed change mechanism a pitman, means for reciprocating said pitman, racks on said pitman, a power shaft, a gear on said power shaft meshing with said racks, means actuated by movement of the pitman for alternately rotating one of said racks while holding the other thereof during alternate strokes of the pitman, a lever member having an extending portion arranged to contact one of said racks for reversing the operation of both thereof, and means for operating said lever member.

9. In speed change mechanism a pitman, means for reciprocating said pitman, racks on said pitman, a power shaft, a gear on said power shaft meshing with said racks, means actuated by movement of the pitman for alternately rotating one of said racks while holding the other thereof during alternate strokes of the pitman, a lever member having a hub portion screw threaded in said pitman, and means for rotating said lever member for causing movement thereof to contact one of said racks for reversing the operation of both thereof.

In witness whereof, I hereunto set my hand.

ROBERT E. WINTERS.

Witnesses:
GRETTA W. ALSTON,
ANNA CURREN.